United States Patent
Riseberg et al.

[11] 3,984,785
[45] Oct. 5, 1976

[54] OPTICAL LOGIC DEVICE

[75] Inventors: Leslie A. Riseberg, Sudbury; Alexander Lempicki; Harold Samelson, both of Wayland, all of Mass.

[73] Assignee: GTE Laboratories Incorporated, Waltham, Mass.

[22] Filed: Feb. 28, 1975

[21] Appl. No.: 554,252

Related U.S. Application Data

[63] Continuation-in-part of Ser. No. 430,996, Dec. 26, 1973.

[52] U.S. Cl. .................. 331/94.5 M; 350/160 R
[51] Int. Cl.² ................................ H01S 3/10
[58] Field of Search .............. 331/94.5; 332/7.51; 350/160

[56] References Cited
UNITED STATES PATENTS
3,469,206   9/1969   Harris et al. .............. 331/94.5 C

*Primary Examiner*—William L. Sikes
*Attorney, Agent, or Firm*—Irving M. Kriegsman; Bernard L. Sweeney; Robert A. Seldon

[57]  ABSTRACT

A optical logic device is described in which binary logic functions are accomplished by use of a laser, such as a dye laser, whose output has a polarization direction which is determinable by the direction of polarization of an input excitation laser pumping pulse. An optical component, such as a birefringent element, establishes a pair of bistable polarization directions representative of the binary logic levels. Bistable polarization operation is achieved by requiring a greater intensity of an input laser pumping signal to establish one polarization direction when compared with the input intensity required to establish the other polarization direction. A Brewster plate may be employed to establish the bistable operation of the laser medium.

13 Claims, 3 Drawing Figures

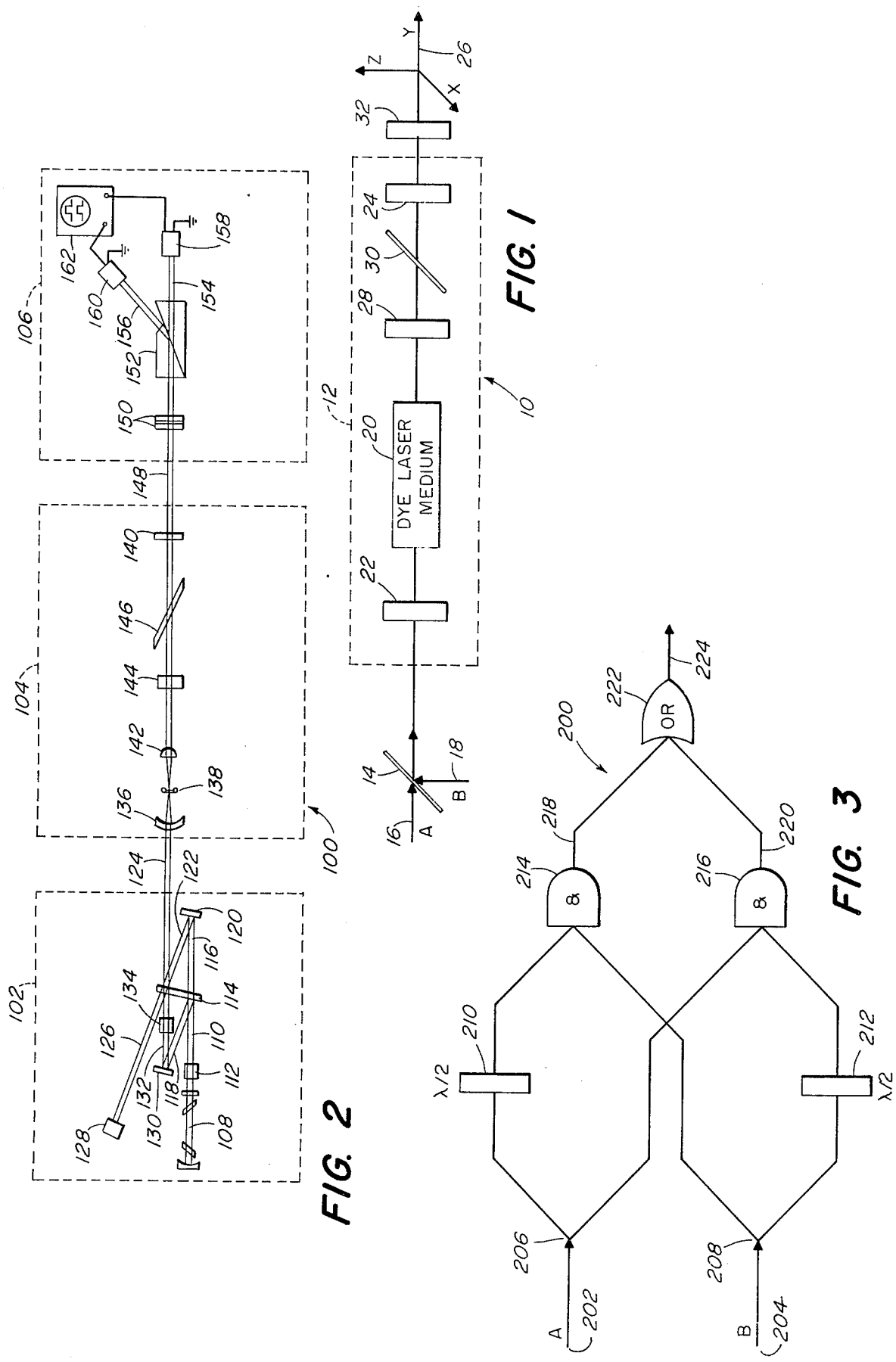

OPTICAL LOGIC DEVICE

CROSS-REFERENCE TO A RELATED APPLICATION

This application is a continuation-in-part of our earlier filed copending application, Ser. No. 430,996, filed Dec. 26, 1973.

FIELD OF THE INVENTION

This invention relates generally to optical circuits for use in performing logic operations. More specifically, the present invention is related to an optical logic device which employs bistable polarization directions to provide binary logic functions.

BACKGROUND OF THE INVENTION

With the rapid expansion of digital data processing in recent years, much of the research has attempted to discover new methods and materials for use in such data processing equipment. One of the most important considerations in these research efforts is an increase in the speed at which the computations may be made.

It is believed that if logic operations can be performed in a completely optical manner that a significant break-through in processing speed may be achieved relative to digital data processing in conventional electronic and electro-optical systems.

The development of the laser has led many investigators to explore different materials for the existence of lasing properties. One class of materials in which considerable interest has been shown is known as laser dyes. The dye lasers utilize organic dyes as the laser medium. A large number of such dyes have been discovered and described in the literature. A dye, generally known as Rhodamine 6G, has been found to be particularly useful for a variety of laser applications. Dye lasers are described in detail in U.S. Pat. No. 3,679,995, the subject matter of which is incorporated herein by reference.

A unique feature of the dyes used in dye laser configurations is that a collimated laser output beam can be generated whose direction of polarization can be predominantly determined by the polarization direction of the pumping energy employed to excite the dye laser if that pumping light is injected axially into the dye laser cavity. This characteristic has been described at length in the art, see, for example, Section 3.8 on page 62 of a book entitled *Handbook of Fluorescence Spectra of Aromatic Molecules*, written by I. B. Berlman and published by the Academic Press in 1971. Another publication describing the dependence of the direction of polarization of the luminescence eminating from a fluorescing material upon the direction of polarization of exciting light appears in Section 9, page 163 of a book by P. P. Feofilov entitled *The Physical Basis of Polarized Emission*, published by Consultants Bureau, 1961.

Simply stated, the dye molecules are non-spherical and the electric dipole moment for optical transitions is anisotropic. A given molecule in the laser medium is randomly oriented, giving those molecules whose dipole moments are aligned with the direction of polarization of the exciting energy the highest probability of excitation. If the orientational rotation is sufficiently slow relative to the lifetime of the excited state, the emitted light has a preferred direction of polarization. In a laser which is sensitive to small differences in gain, the effect is a complete polarization of the laser emission. If the losses are isotropic, the direction of polarization of the output is the same as that of the exciting energy.

SUMMARY OF THE INVENTION

It is, therefore, an object of the present invention to provide a novel logic device which is completely optical.

Another object of the invention is to provide such an optical logic device which may be utilized as a basic building block for performing a complete range of logic operations.

It is a further object of the invention to provide such an optical logic device which is simple in construction and adaptable to miniaturization.

Briefly, the invention in its broadest aspect is an optical logic device. The optical logic device includes a laser resonator which in turn includes means for producing an optical laser output having a direction of polarization along selectable directions. There is an optical component located in the laser resonator for establishing polarization direcitons for laser output from the resonator with logical significance to form the optical logic device.

A preferred embodiment of the optical logic device in accordance with the present invention is provided by forming an optical laser resonator which includes an active laser medium whose active molecules can be excited to produce an emission whose direction of polarization will be predominantly in the direction of polarization of the exciting energy. The laser resonator further includes an optical component which determines a pair of unique polarization directions for light propagating along the resonator axis. Such polarization directions may be obtained, for example, with a birefringent component located on the resonator optical axis which is oriented so as to exhibit birefringence for the light emitted along the resonator axis. The birefringent element in the laser resonator establishes polarization along a pair of bistable directions to which binary logic values may be assigned.

The combination of the photoselection of the laser active medium by particular spatial polarization directions enables the optical logic device of this invention to be used for forming a logic building block. A plurality of such devices can be arranged and coupled together to perform optically a wide variety of binary arithmetic functions.

One polarization direction can be favored over another by requiring that different input laser pump levels must be achieved in order to establish a lasing output for the different polarization directions. In this manner, various optical logic devices may be selectively cascaded to form logic circuits.

These and other objects, advantages and features of an optical logic device in accordance with the invention can be understood from the following detailed description of the invention taken in conjunction with the associated drawing.

BRIEF DESCRIPTION OF THE DRAWING

In the Drawing:

FIG. 1 is a schematic representation of a simple optical logic device in accordance with the present invention;

FIG. 2 is a schematic diagram of a presently preferred embodiment of an apparatus according to the present invention for optically accomplishing logic functions; and FIG. 3 is a schematic representation of an optical logic circuit for performing an arithmetic function in accordance with the invention.

DETAILED DESCRIPTION OF THE PREFERRED EMBODIMENTS

In referring to the various figures of the drawing hereinbelow, like reference numerals will be used to refer to identical parts of the apparatus.

With reference initially to FIG. 1, an optical logic device in accordance with the invention is shown schematically and is identified generally by the reference numeral 10. As will be explained below, the device 10 may be used as either a logic AND gate or a logic OR gate. The device 10 includes a laser resonator segment 12 and an optical combining device 14 arranged to combine optical logic pulses arriving essentially simultaneously along a pair of input directions labelled respectively 16 and 18.

The logic pulses present on the inlets 16 and 18 may be derived from other optical logic devices such as 10 or from an optical pulse generator such as is shown in FIG. 2 and identified generally by the reference numeral 102. The input optical pulses at 16 and 18 are polarized in either of two orthogonal directions which will be recognized and treated herein as the respective optical binary logic variables, "1" and "0". Generally, the pulse at 16 will be referred to as "A" and the pulse at 18 and "B". As will be described in greater detail below, the pulse generator 102 produces a pair of optical pumping pulses at its output 124. These optical pumping pulses are each linearly polarized along either of two orthogonal axes, shown as X and Z in FIG. 1. The optical pumping pulses may both be linearly polarized in the Z direction, both linearly polarized in the X direction, or one polarized in the Z direction and the other polarized in the X direction. For the convenience in the succeeding discussion, a laser pump pulse linearly polarized in the Z direction will be referred to as a logic 1 and a laser pump pulse linearly polarized in the X direction will be referred to as a logic 0. Obviously, this choice of orientations is merely arbitrary and may be reversed at the convenience of the designer.

The laser resonator segment 12 which is central to the present invention is of a type whose laser output emission can be controlled so as to occur with a predominant polarization direction. As discussed above, in the preferred embodiment such a control over the polarization direction of the laser emission is obtainable by the use of a resonator configuration which is characterized by some degree of birefringence for light travelling axially therethrough. Such a result is disclosed in U.S. Pat. No. 3,622,912, the subject matter of which is incorporated herein by reference.

The dye laser element 20 is disposed between a pair of resonator mirrors 22 and 24 and along a system optical axis 26. The input mirror 22 is at least partially transparent at the wavelength of the laser pumping pulses present on lines 16 and 18 and highly reflective at the dye laser emission wavelength. The mirror 24 which serves as the output for the resonator segment 12 is slightly transparent at the dye laser emission wavelength. In this manner, the linearly polarized laser pumping pulses are freely admitted to the resonator cavity where they are used to excite the dye laser medium; however, they are completely restrained from passing out of the cavity along the output optical axis 26.

The dye laser medium 20 which is disposed in the resonant cavity is formed with an organic dye, such as preferably Rhodamine 6G, in either a solid or liquid medium. The host medium is preferably sufficiently viscous so as to restrict the rotational freedom of the dye molecules. This requirement may be satisfied by both liquid and solid host materials. The probability of exciting a dye molecule with linearly polarized light is a function of the square of the cosine of the angle between the direction of polarization and the axis of the dye molecule. As a result, only a fraction of the entire collection of randomly oriented molecules is excited with a laser pump pulse linearly polarized along either the Z or X direction. The preferred viscosity is a function of the relaxation time of the dipoles of the particular dye selected. The medium selected should be sufficiently viscous so as to restrict the rotational movement of the excited molecules for a time sufficiently long relative to the relaxation of the dipoles such that the concomitant emission of laser energy by the medium remains polarized in the direction of the exciting laser pump pulses.

Disposed within the optical resonant cavity is a birefringent optical element 28 which defines a pair of unique orthogonal axes of polarization, such as the X and Z axes. The birefringent element may be formed of any suitable birefringent material. The birefringent element 28 is oriented in the resonant cavity with its optic axis aligned with the resonant cavity optical axis 26. When oriented in this manner, the birefringent element 28 establishes a pair of directions along its "fast" and "slow" axes along which light passing therethrough will be linearly polarized. If the birefringent element 28 is rotationally oriented so that the fast and slow axes correspond to the Z and X axis, the light emitted by the dye laser element 20 is polarized along the same linear directions as the input laser pump pulses from lines 16 and 18. Light which is polarized in any other direction such as that emitted by a molecule which has undergone a certain amount of rotation suffers conversion into elliptically polarized light. The elliptically polarized light does not present a self-consistent field solution corresponding to any lower order mode of laser operation and as a result is discriminated against. Only linearly polarized light with a direction of polarization aligned along either the X or Z directions corresponds to a self-consistent field solution, and, therefore, to either of two specific field configurations corresponding to the $TEM_{oo}$ mode. Hence, it is desirable to design the resonator to be appropriate for $TEM_{oo}$ operation. Under these conditions, the resonator segment 12 exhibits a bistable polarization operation which may be used to form an optical logic device 10.

The laser resonator 12 can achieve laser action with an excitation at the inputs 16 and 18 by pumping light which is linearly polarized in either of the low loss directions, i.e., X or Z. In such case, laser emission occurs at the lowest possible threshold level for the excitation input light. For unpolarized light, however, the threshold would be about a factor of two higher with the laser emission then occurring in both of the polarization directions.

In the formation of an AND gate, however, a threshold or intensity control element 30 is also included within the resonant cavity 12 as is shown in FIG. 1.

Such an element 30 may be a Brewster plate. This plate is oriented, for example, to transmit the X or 0 logic polarization direction with a minimum loss while the Z or 1 logic polarization direction is transmitted with a loss which exceeds that for the X logic polarization direction by a predetermined amount. In such case, the threshold excitation level needed to produce a laser output from the resonator segment 12 with an Z or 1 polarization direction is substantially higher than that required for the X or 0 polarization direction. This difference in threshold level is selected so that when a Z or 1 polarization direction pulse appears singly at either of inputs 16 and 18, no 1 polarization direction laser output can result; however, when 1 pulses arrive simultaneously at both of the inputs, a Z or 1 polarization direction pulse is produced at the laser output 26.

When a X or 0 polarization direction excitation pulse arrives at input 16 and an Z or 1 excitation pulse arrives at input 18, then the laser output remains polarized in the X direction, i.e., it is a 0. The logic truth table representative of the operation of the optical logic device 10 as described so far is:

|   | A · B = T |   |
|---|---|---|
| A | B | T |
| 0 | 0 | 0 |
| 0 | 1 | 0 |
| 1 | 0 | 0 |
| 1 | 1 | 1 |

When an OR gate is formed by device 10, the threshold excitation controller 30 is rotationally oriented orthogonal to its position in the AND gate such that a single 1 or Z polarization direction excitation pulse is above the threshold laser level while a single 0 or X direction polarization excitation pulse is below the threshold, though two 0 excitation pulses are above the threshold. The truth table for the optical OR gate 10 is:

|   | A + B = T |   |
|---|---|---|
| A | B | T |
| 0 | 0 | 0 |
| 0 | 1 | 1 |
| 1 | 0 | 1 |
| 1 | 1 | 1 |

It should be noted that a NOT gate may be conveniently implemented in an optical logic device by the insertion of a polarization rotator such as shown schematically at 32. Such a polarization rotator provides 90° of polarization direction rotation thereby providing the NOT function. A one-half wave birefringent plate, a quartz crystal, a birefringent fluid, or other suitable means may be employed for accomplishing this function. In this manner, NAND and NOR logic elements are also formed optically and fall within the purview of the invention.

Referring now to FIG. 2 of the drawing, wherein there is shown an experimental arrangement identified generally by the reference numeral 100 in which such logic operation has been accomplished. The arrangement 100 consists generally of an input section 102, a dye laser gate 104 and an analyzer 106. The input section 102 includes a laser 108, such as a xenon laser, with Brewster angle windows to produce linearly polarized pulsed outputs in the green portion of the electromagnetic spectrum. The output beam 110 from the laser 108 passes through a polarization rotating element 112. The element 112 may either be a magneto-optic element, an electro-optic element or may be a passive device which is removable from the path of the beam 110 so that the direction of linear polarization of the beam 110 may be selected to be in either of two orthogonal directions corresponding to X and Z in FIG. 1.

The beam 110 next encounters a beam splitter element 114 which divides the laser beam into a pair of essentially identical output beams 116 and 118. The transmitted output beam 116 passes through the beam splitter 114 to a totally reflective mirror 120. The beam is reflected by the mirror 120 and forms another beam 122 which is reflected back toward the beam splitter 114. At the beam splitter 114, it is divided into a reflected output beam 124 which is linearly polarized in one of the two orthogonal directions and a transmitted beam 126 which passes through the beam splitter 114 to a detector 128 where the direction of polarization may be ascertained.

The reflected portion 118 of the beam 110 is again reflected by a second mirror 130 to form a reflected beam 132. A second polarization rotating element 134 identical to polarization rotating element 112 is placed in front of the mirror 130 in the path of the beam 132. By this means, the beam 132 may be rotated to form an excitation pulse of the opposite polarization to the previously described portion of the output beam 124 or can pass beam 132 without rotation at which time both portions of the beam 124 will have the same direction of polarization. The reflected beam 132 then reencounters the beam splitter 114 and is divided into an output beam portion 124 and a reflected portion 126. At this time, the output beam 124 contains a pair of laser excitation pulses of selected directions of polarization so as to form logic input pulses such as are schematically shown at 16 and 18 of FIG. 1. The input section 102 is a modified form of a Mach-Zehnder interferometer. In this arrangement, the angles of incidence on the beam splitter 114 are less than 5° which is sufficiently small to eliminate reflectivity discrimination between the two polarizations. Parallelism of the three reflecting elements insures superposition of the two optical pumping pulses in the output beam 124.

The dye laser gate 104 is essentially as described hereinabove with reference to FIG. 1. An input optical element 136 serves to pass the input laser pump pulses in the beam 124 and to focus those input pulses onto a dye laser element 138. The element 136 also serves as a mirror for the resonant cavity together with partially transparent mirror 140. The dye laser element 138 is a free-flowing jet stream at normal incidence which is utilized to eliminate uncontrolled birefringence. Such a configuration has been shown and described by D. G. Youmans et al., Vol. 23, No. 8, pp. 442–4 (1973). The dye laser medium is a $10^{-4}$ to $10^{-2}$ molar solution of Rhodamine 6G dissolved in ethylene glycol. The concentration is adjusted in order to absorb the majority of the pumping light emitted from the xenon laser 108. By adjusting concentration and other parameters, an optimal amount of light may be absorbed and the lowest threshold achieved.

The resonant cavity established between the reflective elements 136 and 140 is preferably limited to the TEM$_{oo}$ mode of operation. This mode inherently has the lowest threshold and is established through the containment of the active medium and the restriction of the waist size of the beam for this particular resonator according to Gaussian optics. The controlled birefringence required in the dye laser gate 104 is provided by a quartz retardation plate 144 and the differential loss by a plate oriented essentially at the Brewster angle to the laser beam. Adjustments of the orientations of the Brewster angle plate permit a continuously variable differential loss between 0 and about 13%.

The threshold of a particular dye laser element has been found experimentally to be in the range of about 1 to 10 watts of peak input laser pump power when pumped by several lines in the green from a xenon laser emitting output pulses of approximately 200 nanoseconds duration. However, this could easily be reduced by refinement of the cavity parameters in the manner which is well known in the art.

The Rhodamine 6G dye laser emits within the range of approximately 5,800A to about 6,000A, thereby yielding an output beam 148 from the dye laser gate 104 upon which has been performed the desired logic function.

An analyzer stage 106 is incorporated in this experimental configuration to verify the existence of the logic functions attributable to the dye laser gate 104. A series of filters 150 is inserted in the beam 148 to remove completely any green excitation light remaining in the beam 148 from the xenon laser 108. A Glan-Thompson prism 152 is utilized to separate the two linearly polarized components of the beam 148. The separated components are shown as beams 154 and 156, are respectively detected by photodetectors 158 and 160, and are displayed on an oscilloscope 162. In this manner, regardless of the output of the dye laser gate 104 the signal is detected in the analyzer 106 thereby verifying the performance of the dye laser gate 104.

FIG. 3 illustrates an exemplary optical logic circuit 200 which performs the function of an EXCLUSIVE OR gate. The circuit 200 is formed with a plurality of optical logic devices 10 arranged to form AND and OR gates as shown in FIG. 3 and described hereinabove. Each of the inputs, A and B or 202 and 204 respectively are split into two identical pulses with a pair of beam splitters at 206 and 208. One of each pair of split input pulses is passed through a NOT gate 210 or 212 which is in the form of a half-wave birefringent plate which causes a 90° rotation of the direction of polarization. The pulse from one input which has passed through a NOT gate is then combined with the unaltered split pulse from the other input and the combinations are applied to a pair of optical logic AND gates 214 and 216. The outputs 218 and 220 from the AND gates 214 and 216, respectively, are then combined at an optical logic OR gate 222 to provide an optical EXCLUSIVE OR function at an output 224. The truth table for the logic circuit 200 is:

| A | B | $\bar{A}$ | $\bar{A}B$ | $\bar{B}$ | $A\bar{B}$ | $\bar{A}B + A\bar{B}$ |
|---|---|---|---|---|---|---|
| 0 | 0 | 1 | 0 | 1 | 0 | 0 |
| 0 | 1 | 1 | 1 | 0 | 0 | 1 |
| 1 | 0 | 0 | 0 | 1 | 1 | 1 |
| 1 | 1 | 0 | 0 | 0 | 0 | 0 |

Having thus described an optical logic device in accordance with the invention, its advantages may be appreciated. The combination of the photoselection characteristic of dye molecules in a laser medium to align along a particular spatial orientation together with the anisotropic nature of a birefringent resonator provides the optical logic functions. The optical logic device has been described in conjunction with components operating in the beam mode. It should be understood, however, that the discrete optical components utilized in this description of the invention may also be provided within integrated optical configurations.

While there have been shown and described what are considered to be the preferred embodiments of the present invention, it is obvious that many changes and modifications will be apparent to one of ordinary skill in the art. It is intended that the scope of the present invention be limited only by the spirit of the invention and the scope of the appended claims.

What is claimed is:

1. An optical logic device comprising:
   optical combining means for combining a pair of essentially simultaneously applied input optical signals which are respectively polarized in one of two unique directions corresponding to respective binary logic variables;
   a laser oscillator for receiving the combined input signals and having a predominant output polarization direction related to the polarizations of the laser input signals;
   an optical component located in the resonator of the laser for defining a pair of unique axes of polarization for the laser output to impart bistable polarization operation thereto; and
   means for establishing selective threshold levels for the stimulation of the respective bistable outputs to establish binary logical significance thereto.

2. The optical logic device as claimed in claim 1, wherein the optical component is formed with a birefringent element.

3. The optical logic device as claimed in claim, 1 wherein said threshold establishing means includes a Brewster plate oriented to provide said selected threshold levels.

4. An optical logic device actuated in response to an input laser pump having a predetermined polarization comprising
   a laser resonator including
   a laser medium characterized by providing a laser output having a polarization direction determined by the polarization direction of an input laser pump directed at the laser resonator;
   an optical component located in the resonator to establish first and second polarization directions for the laser resonator; and
   an optical element located in the resonator and selected to determine the threshold intensity level of the laser pump needed to establish a laser output from the resonator with one of the first and second polarization directions to provide logical significance to the first and second polarization directions of the resonator laser output.

5. The optical logic device as claimed in claim 4, wherein the optical element is selected to establish the first polarization direction with a first predetermined intensity level of the input laser pump and with the second polarization direction being established with a laser pump intensity which exceeds the first predetermined intensity level by a logic determining quantity to establish respectively opposite logical significance for the first and second polarization directions.

6. The optical logic device as claimed in claim 4, wherein the optical component includes a birefringent material to produce said first and second polarization directions.

7. The optical logic device as claimed in claim 6, wherein the optical element is a Brewster plate oriented to establish the threshold intensity level needed to establish the laser output with either one of the first and second polarization directions.

8. An optical logic device actuated in response to an input lasing pump of a predetermined polarization direction comprising
  a laser resonator including a laser medium characterized by providing a laser output having a polarization direction determined by the polarization direction of an input laser pump directed at the laser resonator;
  means for establishing first and second polarization directions for the laser resonator, with the first polarization direction being stimulated at a first predetermined intensity level of the input laser pump and with the second polarization direction being stimulated at a laser pump intensity level which exceeds the first predetermined intensity level by a logic determining quantity to establish respectively opposite logical significance for said first and second polarization directions of the resonator laser output.

9. The optical logic element as claimed in claim 8, wherein said first and second polarization directions establishing means further includes
  a birefringent element disposed in the laser resonator to provide a laser output in either of said first and second polarization directions; and
  an optical element selected to enhance the first polarization direction in comparison with the second polarization direction, with the optical element further providing an enhancement difference to establish said logic significance.

10. The optical logic element as claimed in claim 9, wherein the optical element is a Brewster plate oriented to pass the first polarization direction at a smaller loss than the second polarization direction fo form the logical significance.

11. The optical logic element as claimed in claim 9, wherein the laser medium is formed with an organic dye.

12. An optical logic circuit comprising a plurality of optical laser logic devices which are optically coupled to laser pump each other with laser outputs having one pair of bistable distinct polarization directions;
  each of the optical logic devices being formed with a laser medium characterized by providing a laser output having a polarization direction determined by the polarization direction of an input laser pump from another optical logic device;
  an optical component located in each optical logic device to establish an output for the laser medium with one of the pair of distinct polarization directions; and
  an optical element located in each optical device and selected to determine the threshold intensity level of the input laser pump needed to establish a laser output with one of the pair of polarization directions in correspondence with a logical significance for said respective polarization directions.

13. A optical logic circuit as claimed in claim 12, wherein the optical element in each optical logic device is selected to enhance a first polarization direction with a predetermined intensity level of an input laser pump and with a second polarization direction being stimulated with a laser pump intensity which exceeds the first predetermined intensity level by a logic determining quantity to establish respectively opposite logical significance for the first and second polarization directions.

* * * * *

PO-1050
(5/69)

UNITED STATES PATENT OFFICE
CERTIFICATE OF CORRECTION

Patent No 3,984,785                                    Dated   October 5, 1976

Inventor(s)   L. A. Riseberg, A. Lempicki & H. Samelson

It is certified that error appears in the above-identified patent and that said Letters Patent are hereby corrected as shown below:

In the Abstract, line 1, delete "A" and insert --An--;

Column 2, line 23, delete "direcitons" and insert --directions--;

Column 6, lines 35 and 36, delete "reencounters" and insert

--re-encounters--.

Signed and Sealed this

Twenty-eighth Day of December 1976

[SEAL]

Attest:

RUTH C. MASON
Attesting Officer

C. MARSHALL DANN
Commissioner of Patents and Trademarks